(12) United States Patent
Naito et al.

(10) Patent No.: US 7,905,434 B2
(45) Date of Patent: Mar. 15, 2011

(54) POWDER PROCESSING APPARATUS

(75) Inventors: Makio Naito, Ibaraki (JP); Hiroya Abe, Minoh (JP); Kiyoshi Nogi, Ikeda (JP); Masuo Hosokawa, Toyonaka (JP); Takehisa Fukui, Obu (JP); Masahiro Yoshikawa, Yawata (JP)

(73) Assignee: Hosokawa Micron Co., Ltd., Osaka (JP)

( * ) Notice: Subject to any disclaimer, the term of this patent is extended or adjusted under 35 U.S.C. 154(b) by 0 days.

(21) Appl. No.: 12/718,614

(22) Filed: Mar. 5, 2010

(65) Prior Publication Data

US 2010/0155516 A1   Jun. 24, 2010

Related U.S. Application Data

(62) Division of application No. 10/561,600, filed as application No. PCT/JP03/14485 on Nov. 13, 2003, now Pat. No. 7,686,238.

(30) Foreign Application Priority Data

Jun. 20, 2003 (JP) ................. 2003-176115
Jul. 24, 2003 (JP) ................. 2003-279280

(51) Int. Cl.
  *B02C 19/00* (2006.01)
(52) U.S. Cl. ............ 241/57; 241/301; 241/DIG. 14
(58) Field of Classification Search .......... 241/1, 18, 241/22, 23, 30, 301, DIG. 14, 57
See application file for complete search history.

*Primary Examiner* — Mark Rosenbaum
(74) *Attorney, Agent, or Firm* — The Webb Law Firm

(57) ABSTRACT

In order to manufacture the compound powder or the porous granulated substance in an efficient manner, a powder processing apparatus has an accumulating face on which the processing target powder is to be accumulated and a processing face disposed in opposition to the accumulating face and convexly curved, and a moving means for moving the accumulating face and the processing face along the accumulating face relative to each other. The apparatus comprises an excitement treatment means capable of applying an excitation energy to the processing target powder accumulated on the accumulating face from an excitation energy supplying portion disposed in opposition to the accumulating face or an oscillation means for oscillating the accumulating face or the processing face in a direction intersecting the accumulating face.

7 Claims, 5 Drawing Sheets

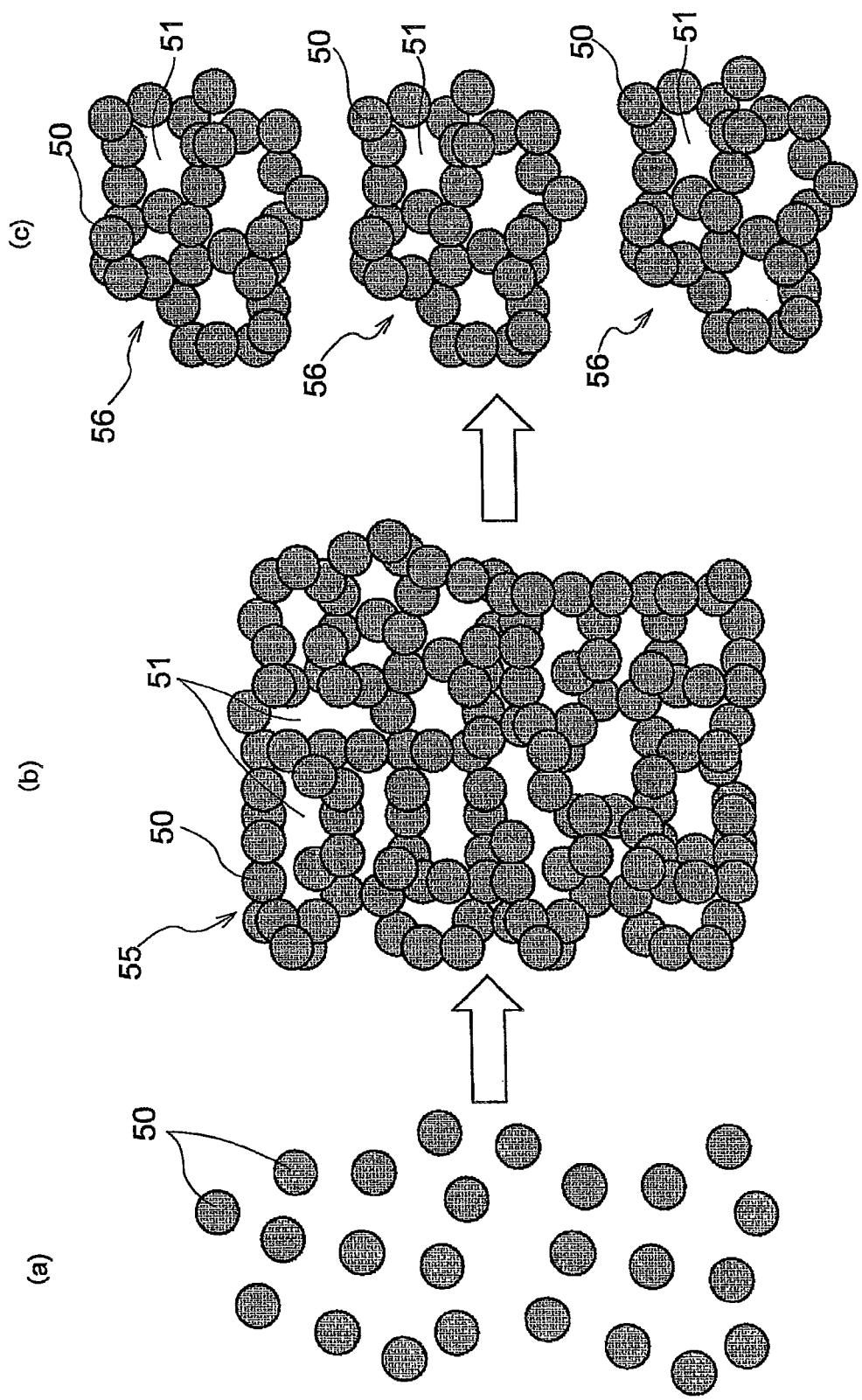

US 7,905,434 B2

POWDER PROCESSING APPARATUS

CROSS-REFERENCE TO RELATED APPLICATION

This application is a divisional application of U.S. patent application Ser. No. 10/561,600, filed on Mar. 15, 2007, which is a national stage filing under 35 U.S.C. 371 of PCT/JP2003/014485, filed Nov. 13, 2003. The entire contents of the above-referenced applications are incorporated herein by reference.

BACKGROUND OF THE INVENTION

1. Field of the Invention

The present invention relates to a powder processing method for milling processing target powder by applying, in particular, a compressive force and a shearing force thereto, as a mechanical treatment for activating the processing target powder by applying a mechanical force thereto. The present invention relates also to a powder processing apparatus having an accumulating face on which the processing target powder is to be accumulated and a processing face disposed in opposition to the accumulating face and convexly curved, and a moving means for moving the accumulating face and the processing face along the accumulating face relative to each other. The present invention relates also to a method of manufacturing porous granulated substance formed by coagulation of the processing target powder and having a number of pores.

2. Description of Related Art

Conventionally, as the powder processing apparatus of the above-noted type, there is known an apparatus having a bottomed cylindrical container member for receiving processing target powder fed therein, a processing member which is disposed in opposition to an accumulating face, i.e. an inner face of the container member and which has a convexly curved processing face at the leading end thereof, and a rotational driving means (an example of "moving means") for rotating the container member and the processing member relative to each other (see e.g. Japanese Patent Application "Kokai" No. 63-42728 (referred to as Prior-Art Document 1 hereinafter), Japanese Patent Application "Kokai" No. 6-134274 (Prior-Art Document 2 hereinafter), Japanese Patent Application "Kokai" No. 5-317679 (Prior-Art Document 3 hereinafter)). With such powder processing apparatuses as above in operation, as the rotational driving means is activated to cause the processing face formed at the leading end of the processing member to be moved relative to the accumulating face formed in the inner face of the container member so as to apply a compressive force and a shearing force to the processing target powder at the gap between the accumulating face and the processing face, thus effecting a milling treatment to the processing target powder, for example.

Further, the above-described Prior-Art Document 3 discloses a technique in which the above-described powder processing apparatus is employed for milling and mixing, by applying strong compressive and shearing forces to a mixed powder thereto, the powder mix being obtained by adding fine ceramics powder of e.g. silicon nitride or zirconia to a metal powder of e.g. stainless steel, thereby compounding the metal powder and the fine ceramics powder in such a manner that a coating layer comprised of the metal powder and the fine ceramics powder is formed on surfaces of cores of metal particles.

Also, as a compound powder obtained by compounding processing target powder with another substance, there is known nitrogen-containing titanium oxide powder obtained by compounding titanium oxide powder with nitrogen element. And, it is known that this nitrogen-containing titanium oxide powder acts as a photocatalyst.

In this way, as a powder processing method for manufacturing a compound powder by compounding a processing target powder with another substance, there are known e.g. a method including the steps of stirring and mixing titanium oxide powder and urea as a nitrogen compound for causing the urea to be adsorbed on the titanium oxide powder and then heating them together (see e.g. Japanese Patent Application "Kokai" No. 2002-154823 (referred to as Prior-Art Document 4 hereinafter)), a method comprising sputtering titanium oxide powder as a target in a nitrogen-containing gas (see e.g. Japanese Patent Application "Kokai" No. 2000-140636 (referred to as Prior-Art Document 5, hereinafter)), a method comprising effecting a nitrogen plasma treatment on titanium oxide powder (see e.g. Prior-Art Document 4 and Japanese Patent Application "Kokai" No. 11-43759 (referred to as Prior-Art Document 6 hereinafter)), and so on.

In the case of the powder processing methods described in the above-described Prior-Art Documents 1-3 using the powder processing apparatus in compounding a processing target powder such as titanium oxide powder with another substance such as nitrogen, thus manufacturing compound powder, while it is possible to render the surface of the processing target powder to a state of a relatively high activity by milling the powder, it has been difficult for any of these methods alone to compound the processing target powder with another substance.

Also, in the case of the powder processing method described in the above-described Prior-Art Document 4, in order to compound nitrogen contained in urea with the titanium oxide powder, it is necessary to heat the entire titanium oxide powder to e.g. 500° C. for 30 minutes in advance. Hence, the method requires e.g. a heating furnace, thus complicating the processing apparatus and requiring a vast amount of processing time as well.

Further, in the case of the powder processing methods described in the above-described Prior-Art Documents 4-6, if there exists organic substance adsorbed on the surface of the processing target powder such as titanium oxide, this will hinder the compounding of another substance to the metal oxide powder, thus inviting deterioration in the yield. Moreover, e.g. the sputtering treatment alone could not manufacture the compound power in an uniform and efficient manner.

Also, there is known porous granulated substance having a number of pores, hence usable as a heat insulating material with restriction of heat transfer by these pores or as a sound absorbing material with restriction of transmittance of sound waves. And, it is also known that if the pores of such porous granulated substance are formed extremely small, movement of air molecules will be restricted and entrance of air molecules into these pores will also be restricted, so that super low heat conductivity and super high sound absorbency can be achieved. Further, the porous granulated substance having such small pores can be expected to be used as a separating membrane for various components.

Such porous granulated substance can be manufactured by causing fine processing target powder to coagulate by applying a compressive force thereto.

However, in the case of the above-described method of manufacturing porous granulated substance, the application of a compressive force to the processing target powder alone sometimes fails to realize good coagulation of the processing target powder.

Also, when the powder processing apparatus disclosed in any one of Prior-Art Documents 1-3 is used for milling the processing target powder by applying a compressive force and a shearing force to the powder at the gap between the accumulating face and the processing face opposed thereto in association with a relative movement therebetween, an active face such as a newborn face can be formed on the surface of the processing target powder. This is believed to facilitate the coagulation of the processing target powder. As a matter of fact, although a certain degree of coagulation of the milled processing target powder is possible, it was difficult to achieve such degree of coagulation as enables the powder to be used as the porous granulated substance.

SUMMARY OF THE INVENTION

The present invention has been made in view of the above-described state of the art. Its object is to realize a powder processing method and apparatus which are capable of efficiently manufacturing compound powder comprised of processing target powder compounded with another substance.

Another object of the present invention is to realize a powder processing apparatus and a porous substance manufacturing method which are capable of efficiently manufacturing porous granulated substance formed by coagulation of processing target powder and having a number of pores.

For accomplishing the above-noted object, the powder processing method relating to the present invention including the step of effecting a mechanical treatment on processing target powder for its activation by applying a mechanical force thereto, characterized in that while effecting the mechanical treatment thereto, an excitement treatment is effected also on the processing target powder for providing an excitation energy thereto.

Incidentally, in this application, the "excitation energy" means energies required for transition of the processing target powder to a predetermined excited state, these energies being provided by an electrical treatment using discharge plasma, electromagnetic wave such as light, microwave, etc. or other means such as induction heating.

Namely, according to the characterizing feature of the powder processing method described above, by effecting the mechanical treatment, a mechanical force such as a compressive force, a shearing force, an impact force are applied to the processing target powder, so that e.g. a strain of crystal or a newborn face can be formed on the surface of the processing target powder, whereby the surface of the processing target powder can be maintained as an active face capable of effectively receiving compounding with another substance.

Therefore, according to this powder processing method, by effecting the excitement treatment while effecting the mechanical treatment as described above, the processing target powder can be excited to an even further activated state, so that it is possible to render, within a short period of time, the surface of this processing target powder into a state which promotes compounding of another substance with almost no adherence of any organic substance thereto.

Hence, with the simple construction of effecting the mechanical treatment and the exciting treatment simultaneously, the processing target powder can be rendered into a condition in which another substance can be compounded therewith very easily. s Incidentally, in the present application, "another substance" means a substance other than the processing target powder. Also, this another substance can be in any form such as a mono element, compound, a compound material, etc.

According to a further characterizing feature of the powder processing method relating to the present invention, as said mechanical treatment, there is effected a milling treatment for milling the processing target substance by applying a compressive force and a shearing force thereto.

That is, according to the above-described characterizing feature of the powder processing method, by effecting the milling treatment, particle diameters of the processing target powder can be rendered uniform while coagulation of the processing target powder can be restricted, thus increasing the chance of the processing target powder coming into contact with another substance. Further, by effecting the above-described milling treatment, the surface of the processing target powder can be maintained as a newborn face capable of efficiently receiving compounding with another substance with extremely limited adhesion of impurities thereto. Therefore, with this powder processing method, by effecting the excitement treatment along with the milling treatment described above, the processing target powder can be excited to an even activated state, so that it is possible to render, within a short period of time, the surface of this processing target powder into a state which promotes compounding of another substance with almost no adherence of any organic substance thereto, for example.

Therefore, with the simple construction of effecting the milling treatment and the excitement treatment simultaneously, it is possible to realize the condition where another substance can be compounded very easily with the processing target powder.

According to a still another characterizing feature of the powder processing method relating to the present invention, discharge plasma is employed as said excitation energy.

As the excitement treatment described above, there are available an electron excitement treatment involving irradiation of electrons as the excitation energy, an electromagnetic wave excitement treatment involving irradiation of an electromagnetic wave such as ultraviolet radiation, microwave, etc. as the excitation energy. However, according to the above-described characterizing feature of the powder processing method, in the excitement treatment, as the excitation energy, discharge plasma by glow discharge, arc discharge, etc. is irradiated, so that the processing target powder can be excited in an easy and efficient manner and another substance can be compounded with the processing target powder by e.g. sputtering the former onto the latter.

According to a still another characterizing feature of the powder processing method relating to the present invention, during the mechanical treatment and the excitement treatment, said another substance is caused to come into contact with the processing target substance, so that said another substance is compounded with the processing target powder to obtain the compound powder.

That is, according to the above-described characterizing feature of the powder processing method relating to the present invention, during the mechanical treatment such as the milling treatment and the excitement treatment effected simultaneously, another substance is caused to contact the processing target powder, whereby the another subject can be very effectively compounded with the milled and excited processing target powder. As a result, the compound powder can be manufactured in an efficient manner.

Further, when the compound powder is manufactured by the powder processing method relating to the present invention, nitrogen element as said another substance can be compounded with titanium oxide powder as said processing target powder in an efficient manner as described hereinbefore, whereby a nitrogen-containing titanium oxide powder acting as a photocatalyst can be manufactured.

Further, when nitrogen-containing titanium oxide powder is manufactured as compound powder by the powder processing method relating to the present invention, in the mechanical treatment and the excitement treatment, nitrogen gas or nitrogen compound is supplied to the titanium oxide powder thereby to allow nitrogen element to contact the titanium oxide powder, whereby the nitrogen-containing titanium oxide powder as the compound powder can be manufactured.

Namely, by supplying a nitrogen gas or a nitrogen compound gas such as ammonium gas to the processing target powder or mixing a nitrogen compound powder such as urea powder with the processing target powder, it is possible to cause nitrogen element to come into contact with the processing target powder. And, by effecting the mechanical treatment such as the milling treatment and the excitement treatment under this condition, reactive species (radical) of the nitrogen element is formed on the processing target powder, so that the nitrogen element can be effectively compounded with the processing target powder, whereby the nitrogen-containing titanium oxide powder can be manufactured.

According to a still further characterizing feature of the powder processing method relating to the present invention, there is effected a heat treatment for heating the compound power to a range of temperature higher than or equal to its recrystallization temperature and lower than or equal to its critical temperature and then allowing the powder to be cooled to a room temperature.

Incidentally, the recrystallization temperature means the temperature which causes recrystallization of the processing target powder. The critical temperature means the temperature at the critical point between the liquid phase and the gas phase of the processing target powder.

Namely, according to the above-described characterizing feature of the powder processing method, the strain in the crystal in the surface of the compound powder which has developed as the result of the mechanical treatment and the excitement treatment effected is removed by effecting the heat treatment described above, so that the crystalline property of the compound powder surface can be enhanced. As a result, the compounded state between the processing target powder and another substance can be stabilized.

For accomplishing the above-noted object, a powder processing apparatus relating to the present invention comprises an accumulating face on which the processing target powder is to be accumulated and a processing face disposed in opposition to the accumulating face and convexly curved, and a moving means for moving the accumulating face and the processing face along the accumulating face relative to each other, the apparatus being configured to be capable of suitably implementing the above-described powder processing method relating to the present invention, the apparatus being characterized in that as the processing face is moved along and relative to the accumulating face by the moving means, a compressive force and a shearing force are applied to the processing target powder at a gap between the accumulating face and the processing face, whereby the processing target powder is milled, and the apparatus further comprises an excitement treatment means capable of applying an excitation energy to the processing target powder accumulated on the accumulating face from an excitation energy supplying portion disposed in opposition to the accumulating face.

Namely, according to the above-described characterizing feature of the powder treatment apparatus, as the moving moves the processing face along and relative to the accumulating face, a miffing treatment can be effected by applying a compressive force and a shearing force to the processing target powder accumulated on the accumulating face at the gap formed with the processing face. And, by effecting the milling treatment, particle diameters of the processing target powder can be rendered uniform while coagulation of the processing target powder can be restricted, thus increasing the chance of the processing target powder coming into contact with another substance for instance Further, by effecting the above-described milling treatment on the processing target powder, the surface of the processing target powder can be rendered into an activated state with extremely limited adhesion of impurities thereto. Therefore, on the surface of the processing target powder, there can be continuously formed e.g. a newborn face capable effectively receiving compounding with another subject which is placed in contact with the processing target powder.

Further, if this another substance is included in a solid compound powder mixed with the processing target powder, by pressing this solid compound powder against the processing target powder, entrance of another substance into the processing target powder can be promoted.

And, by effecting the so-called excitement treatment by the excitement treatment means for applying an excitation energy to the processing target powder under such milled condition favorable for its compounding with another substance, the processing target powder constituting the processing target powder or the like can be even further activated. So that, another substance placed in contact with this processing target powder can be effectively compounded with the processing target powder, thereby to obtain the compound powder in an efficient manner.

Therefore, as described above, there can be realize a powder processing apparatus capable of applying to the processing target powder not only the mechanical energy comprised of the compressive force and the shearing force, but also the excitation energy simultaneously. Namely, this powder processing apparatus is capable of implementing the powder processing method relating to the present invention described so far. And, with this apparatus, like the powder processing method, the processing target powder and another substance placed in contact therewith can be compounded in an efficient manner.

According to a further characterizing feature of the powder processing apparatus relating to the present invention, said excitation treatment means is configured to irradiate discharge plasma to the processing target powder as the excitation energy.

Namely, according to the above characterizing feature of the powder processing apparatus, as the excitation treatment means irradiates as the excitation energy source, discharge plasma by glow discharge, arc discharge, spark discharge, to excite the processing target powder, the processing target powder can be excited in an easy and efficient manner. Hence, another substance can be compounded with the processing target powder by e.g. sputtering the former onto the latter.

Further, in case the powder processing apparatus of the invention includes the excitement treatment means configured to irradiate discharge plasma to the processing target powder as the excitation energy, if the apparatus further comprises a magnetic field forming means for forming a magnetic field for delimiting an irradiation area of the discharge plasma onto the processing target powder, it becomes possible to localize the area of the processing target powder to be irradiated by the discharge plasma. As a result, the processing target powder can be excited in an efficient manner even with a relatively small amount of energy. Then, with using this powder processing apparatus, another substance placed in contact with the processing target powder can be compounded with the processing target powder efficiently.

According to a still further characterizing feature of the powder processing apparatus of the present invention, said excitation treatment means is configured to act as said excitation energy supplying portion for irradiating the excitation energy from said processing face onto the processing target powder.

Namely, with the above-described characterizing feature of the powder processing apparatus relating to the present invention, the processing face formed in the processing member is utilized as the excitation energy supplying portion, so that the processing target powder being milled at the gap between the accumulating face and the processing face can be subjected to the excitation treatment for providing the excitation energy, simultaneously with the on-going milling treatment. Therefore, there is no need to provide, as the excitation energy supplying portion, any member or section separate from the processing member, so that the apparatus construction can be simple. Further, with the above-described characterizing feature, the excitation energy can be applied at the very moment of the processing target powder being milled at the gap between the accumulating face and the processing face. As a result, at the very moment when the newborn face has been formed on the powder surface during its milling treatment, another substance can be compounded with the surface of the processing target powder effectively.

According to a still further characterizing feature of the powder processing apparatus relating to the present invention, said accumulating face is formed in an inner face of a bottomed cylindrical container member, and said processing face is formed at the leading end of the processing member which projects from the side of a cylinder axis of the container member toward the side of the accumulating face; and said moving means is configured to rotatably drive the container member about the cylinder axis thereof.

Namely, as the moving means rotatably drives the container member about the cylinder axis thereof, the accumulating face formed in the inner face of the container member and the processing face formed at the leading end of the processing member can be moved relative to each other along the accumulating face.

According to a still further characterizing feature of the powder processing apparatus relating to the present invention, said apparatus further comprises a decompressing means capable of decompressing the inside of a casing sealingly housing said container member and said processing member to a pressure below the atmospheric pressure. That is, with the provision of the decompressing means described above, the container member and the processing member are sealedly housed within the casing, and the inside of this casing can be decompressed, so that the excitation energy such as the discharge plasma can be applied in an efficient manner inside the casing decompressed below the atmospheric pressure.

Alternatively, the inside of the casing may not be decompressed, but may be maintained under the atmospheric pressure, so that the excitation treatment means applies the excitation energy such as the glow discharge plasma under this condition.

According to a still further characterizing feature of the powder processing apparatus relating to the present invention, the apparatus further comprises a gas supplying means capable of supplying a predetermining processing gas to the inside of the casing sealingly housing the container member and the processing member. That is, with the provision of the gas supplying means, the processing gas needed for the processing of the processing target powder in the container member can be supplied into the casing, so as to come into contact with the processing target powder.

Further, in case the discharge plasma, as the excitation energy, is irradiated on the processing target powder which is charged in the container member and being milled therein so as to compound another substance with the processing target powder, if argon gas or helium gas as the high energy ion source and the predetermined processing gas such as nitrogen gas, a compound gas such as ammonium or the like containing nitrogen as said another substance are supplied into the container, this processing gas can be effectively contacted with the processing target powder to be compounded therewith.

According to a still further characterizing feature of the powder processing apparatus relating to the present invention, in addition to the characterizing features of the powder processing apparatus described so far, the apparatus further comprises oscillating means for oscillating said accumulating face and said processing face along a direction intersecting said accumulating face.

Further, for accomplishing the above-noted object, a powder processing apparatus relating to the present invention comprises: an accumulating face on which processing target powder is to be accumulated and a processing face disposed in opposition to the accumulating face and convexly curved, and a moving means for moving the accumulating face and the processing face along the accumulating face relative to each other, characterized by: oscillating means for oscillating said accumulating face or said processing face along a direction intersecting said accumulating face.

Further, for accomplishing the above-noted object, according to the present invention, the invention's method of manufacturing porous granulated substance comprises a method of manufacturing porous granulated substance comprised of coagulation of a processing target powder and having a number of pores, characterized by the steps of moving an accumulating face on which processing target powder is to be accumulated and a processing face disposed in opposition to the accumulating face and convexly curved, relative to each other along the accumulating face; and oscillating said accumulating face or said processing face along a direction intersecting said accumulating face, thus applying a compressive fore to the processing target powder at a gap formed between said accumulating face and said processing face, thereby to obtain the porous granulated substance.

That is to say, as described above, the present inventors found out that with the powder processing apparatus capable of providing a milling treatment to the processing target powder by the moving means, if the shearing force applied to the processing target powder is too large compared with the compressive force, the surface of the processing target powder can be rendered to an activated face, but, it is not possible to compress the particles of the processing target powder against each other effectively, so that the coagulation of the processing target powder will not progress effectively. On the other hand, the present inventors found out that in case the shearing force applied to the processing target powder is reduced so as to increase the ratio of the compressive force applied to the processing target powder relative to the shearing force, it is possible to render the surface of the processing target powder to an appropriate activated face with application of an appropriate shearing force to the processing target powder and at the same time to compress the particles of the processing target powder against each other effectively, so that the coagulation of the processing target powder can progress effectively. Based on these findings, the present inventors have perfected this invention.

Namely, according to the first characterizing features of the powder processing apparatus and the method of manufacturing porous granulated substance described above, in addition to the moving means, there is further provided the oscillating means capable of oscillating the accumulating face or the processing face along the direction intersecting the accumulating face thereby to reduce the shearing force to be applied to the processing target powder. With this, the processing target powder can be coagulated effectively, so that the porous granulated substance can be manufactured in an efficient manner.

More particularly, as the processing face disposed in opposition to the accumulating face is convexly curved, between the accumulating face and the processing face, there is formed a gap with a reduced width in the direction of the passage of the processing target powder. And, as the moving means is activated, the processing target powder accumulated on the accumulating face is forced to pass the gap, whereby a compressive force and a shearing force can be applied to this processing target powder.

Further, as the oscillating means is activated to oscillate the accumulating face or the processing face, it is possible to reduce a frictional force generated between the processing target powder and the accumulating face or the processing face. That is, with the activation of the oscillating means, the shearing force to be applied to the processing target powder is reduced. Further, as this oscillation gives an impact to the processing target powder, the compressive force to be applied to the processing target powder can be increased. Therefore, with the above-described characterizing feature, an appropriate shearing force can be applied to the processing target powder to render the surface thereof into an appropriate activated face and at the same time to compress the particles of the processing target powder strongly against each other, thereby to cause them to be coagulated effectively, so that the porous granulated substance can be manufactured in an efficient manner.

According to a further characterizing feature of the powder processing apparatus relating to the present invention, the apparatus further comprises a crushing portion disposed rearwardly of the processing face relative to the direction of the relative movement of the processing face by said moving means and projecting more toward the accumulating face than the processing face.

According to a further characterizing feature of the porous granulated substance manufacturing method relating to the present invention, moving a crushing portion together with the processing face relative to the accumulating face, thereby to crush the porous granulated substance accumulated on the accumulating face, said crushing portion disposed rearwardly of the processing face relative to the direction of the relative movement of the processing face and projecting more toward the accumulating face than the processing face.

That is, according to the above-described characterizing features of the powder processing apparatus and the porous granulated substance manufacturing method, there is provided the crushing portion which effects a relative movement relative to the accumulating face together with the processing face and rearwardly of this processing face by the moving means and which projects more toward the accumulating face than the processing face. With this, the crushing portion is caused to collide with the porous granulated substance accumulated on the accumulating face, so that the porous granulated substance can be broken into appropriate sizes. Further, the crushing portion can scrape the porous granulated substance off the accumulating face, so that the substance can be collected easily. Further, as the porous granulated substance is broken into appropriate sizes as above, the feeding of the porous granulated substance can be improved, so that the a plurality of lumps of porous granulated substance broken into the appropriate sizes can be charged into e.g. a mold to be molded to various shapes.

Further, in the powder processing apparatus described so far, preferably, said oscillating means is configured to allow for adjustment of oscillation frequency of the accumulating face or the processing face, thereby to adjust the magnitude of the shearing force to be applied to the processing target powder at the gap between the accumulating face and the processing face. That is, with adjustment of the oscillation frequency, the frictional force generated between the processing target powder and the accumulating face or the processing face is varied, so that the ratio of the shearing force to be applied to the processing target powder relative to the compressive force can be adjusted appropriately.

Further in the powder processing apparatus described so far, said accumulating face can be formed in an inner face of a bottomed cylindrical container member, and said processing face can be formed at the leading end of the processing member which projects from the side of a cylinder axis of the container member toward the side of the accumulating face; said moving means can be configured to rotatably drive the container member about the cylinder axis thereof, and said oscillating means can be means for oscillating the processing member in a direction intersecting the accumulating face.

That is, as the moving member rotates the container member about its cylinder axis, the accumulating face formed in the inner face of the container member and the processing face formed at the leading end of the processing member can be moved relative to each other along the accumulating face.

And, as the oscillating means oscillates this processing member along the projecting direction, the processing face formed at the leading end of the processing member can be oscillated in the direction intersecting the accumulating face.

Further, as the moving means acts on the container member as the target of its rotational driving and the oscillating means acts on another processing member as its target of oscillating driving other than the target of rotational driving, each means can be simplified.

Further, in the porous granulated substance manufacturing method described so far, by setting various conditions such as the width of the gap formed between the accumulating face and the processing face, the speed of the relative movement and the oscillation frequency between the accumulating face and the processing face and the kind of the processing target powder in such a manner that the processing target powder constituting the porous granulated substance may have an average particle diameter of 1 µm or less and the pores formed in the porous granulated substance have an average diameter of 100 nm or less, the pores can effectively control the movement of air molecules and can also restrict entrance of air molecules into the pores, so that there can be manufactured porous granulated substance capable of achieving super low heat conductivity, super high sound absorbency, etc.

DETAILED DESCRIPTION OF THE INVENTION

Figure 1:
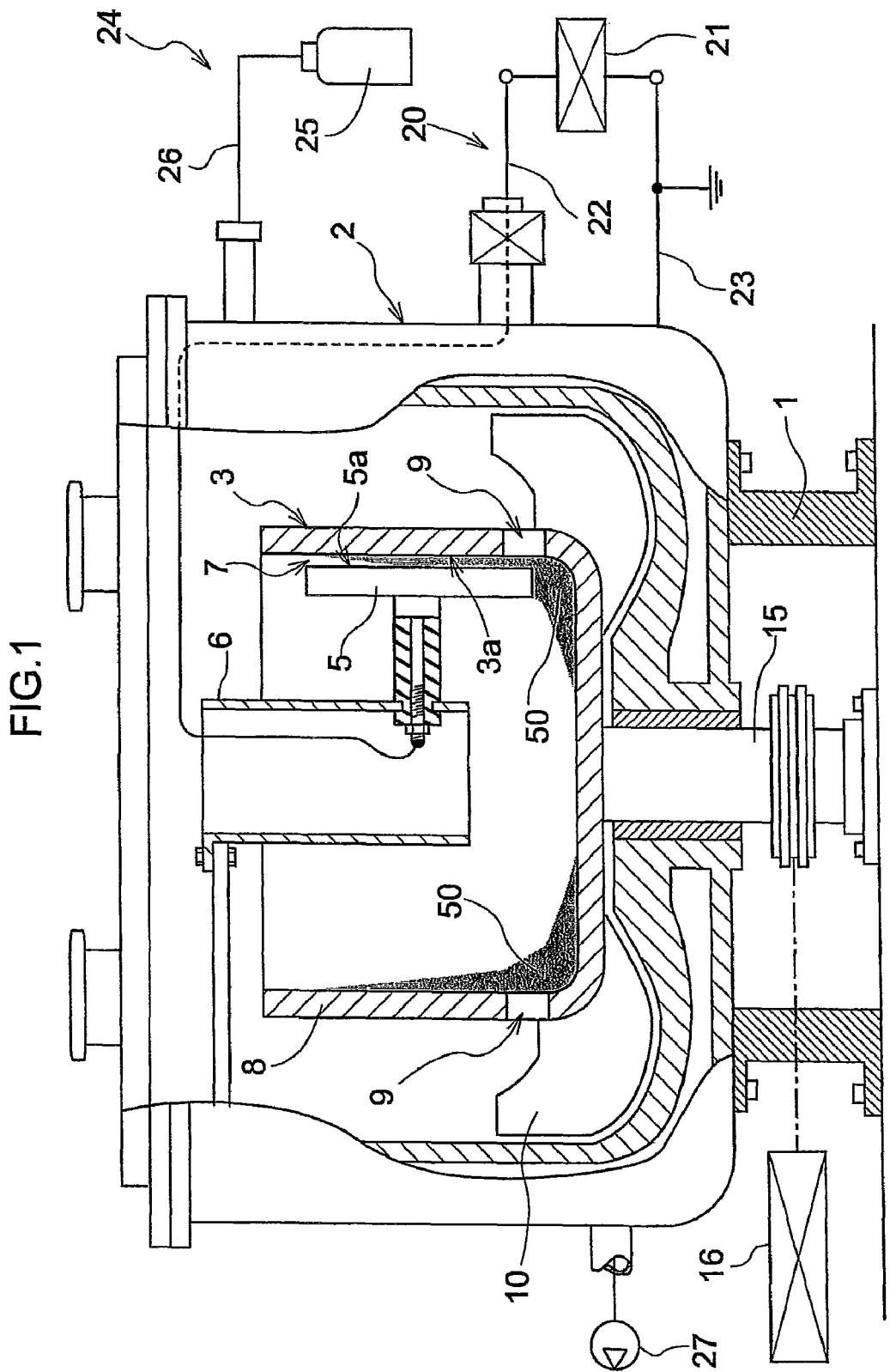
FIG. 1 is a schematic elevation showing a first embodiment of the powder processing apparatus.

Next, embodiments of the present invention will be described with reference to the drawings.

Embodiment of Powder Processing Method

A powder processing method relating to the present invention is provided for sufficiently activating the surface of processing target powder such as titanium oxide, and compounding another substance such as nitrogen element with this processing target powder easily and efficiently, thereby to manufacture a compound powder such as nitrogen-containing titanium oxide.

More particularly, according to this powder processing method, the processing target powder is subjected to a mechanical treatment for providing thereto at least one kind of mechanical force selected from the group consisting of a compressive force, a shearing force and an impact force, thereby to generate at least strain in the surface of the processing target powder thus activating the processing target powder surface. Further, according to this powder processing method, while coagulation of the processing target power particles is restricted by stirring the processing target powder with the above-described mechanical treatment, the processing target powder is subjected also to an excitation treatment for providing thereto an excitation energy such as discharge plasma, or electromagnetic wave (e.g. UV beam, laser, microwave). And, by effecting the excitation treatment simultaneously with the mechanical treatment, the processing target power is activated sufficiently to a condition favorable for compounding with another substance.

And, according to this powder processing method, as another substance is caused to contact the processing target powder in the course of the simultaneous mechanical and excitation treatments, another substance can be effectively compounded with the processing target powder, thereby to manufacture a compound powder.

Further, according to this powder processing method, as the above-described mechanical treatment, there is effected a milling treatment for milling the processing target powder by applying both a compressive force and a shearing force to the processing target powder. And, by effecting such milling treatment, the particle diameters of the processing target powder can be rendered uniform and at the same time, a newborn face can be formed on the surface of the processing target powder. Therefore, by effecting this milling treatment, the surface of the processing target powder can be even more activated to obtain a condition even more favorable for its compounding with another substance.

Further, in case titanium oxide powder is compounded with nitrogen element to obtain nitrogen-containing titanium oxide powder, according to this powder processing method, during the mechanical treatment such as the above-described milling treatment and the above-described excitation treatment, a nitrogen-containing compound gas such as nitrogen gas, ammonium gas, etc. is supplied to the titanium oxide powder, or the powder is mixed with a nitrogen-containing compound powder such as urea powder. With such constructions, the titanium oxide powder can be contacted with nitrogen element, so that the titanium oxide powder can be compounded with nitrogen element, thereby to obtain nitrogen-containing titanium oxide powder.

Further, according to this powder processing method, the method can be constructed such that the mechanical treatment such as the milling treatment and the excitation treatment are effected under a decompressed atmosphere or under an atmosphere of a processing gas employed for such processing.

Further, in this powder processing method, preferably, the compound powder which has been manufactured by compounding the processing target powder with another substance is subjected to a heat treatment for heating the powder to a range of temperature higher than or equal to the recrystallization temperature and lower than or equal to the critical temperature and then allowing it to be cooled to the room temperature. That is, the strain of the crystals in the compound powder surface developed as the result of the above-described mechanical treatment and the above-described excitation treatment can be removed by effecting the above-described heat treatment thereto, so that the crystalline property of the compound powder surface can be enhanced. As a result, the compounded state between the processing target powder and another substance can be stabilized.

Further, in this powder processing method, in case titanium oxide powder is compounded with nitrogen to manufacture nitrogen-containing titanium oxide powder as the compound powder, by effecting the above-described heat treatment to this nitrogen-containing titanium oxide powder, the compounded state between the titanium oxide powder and nitrogen can be stabilized, thereby to provide good photocatalyst property. Further, preferably, the heating operation on the nitrogen-containing titanium oxide powder should be conducted such that the powder is heated for about from 10 minutes to 3 hours to about 300-600° C. and then allowed to be cooled to the room temperature. With this, the compounded state between the titanium oxide powder and nitrogen can be even further stabilized.

Further, in the embodiment of this powder processing method, there has been described mainly the case of effecting, as an example of the mechanical treatment to be effected simultaneously with the excitation treatment, the milling treatment for milling the processing target powder by applying a compressive force and a shearing force thereto. Alternatively, by applying at least one kind of mechanical force selected from a plurality of kinds of mechanical force such as a compressive force, a shearing force, an impact force, etc. to the processing target powder, strain can be provided to the surface or the vicinity of the surface of the processing target powder, thereby to activate it through transition, defect, etc., whereby the effect of the present invention can be achieved.

Further, as examples of such mechanical treatment, there can be cited a stirring operation, a crushing operation, etc. by means of a rotary drum mixer, an impact type crusher, a ball mill, a jet mill, a roller mill, etc. And, in the apparatus for effecting such mechanical treatment, the excitation energy supplying portion can be constructed by utilizing a wall forming the gap through which the processing target powder is caused to pass, the shaft for mechanically treating the processing target powder, electrode terminals newly provided, etc.

First Embodiment of Powder Processing Apparatus

Next, there will be described a first embodiment of the powder processing apparatus relating to the present invention and suitable for implementing the above-described powder processing method with reference to FIG. 1 and FIG. 2.

Figure 2:
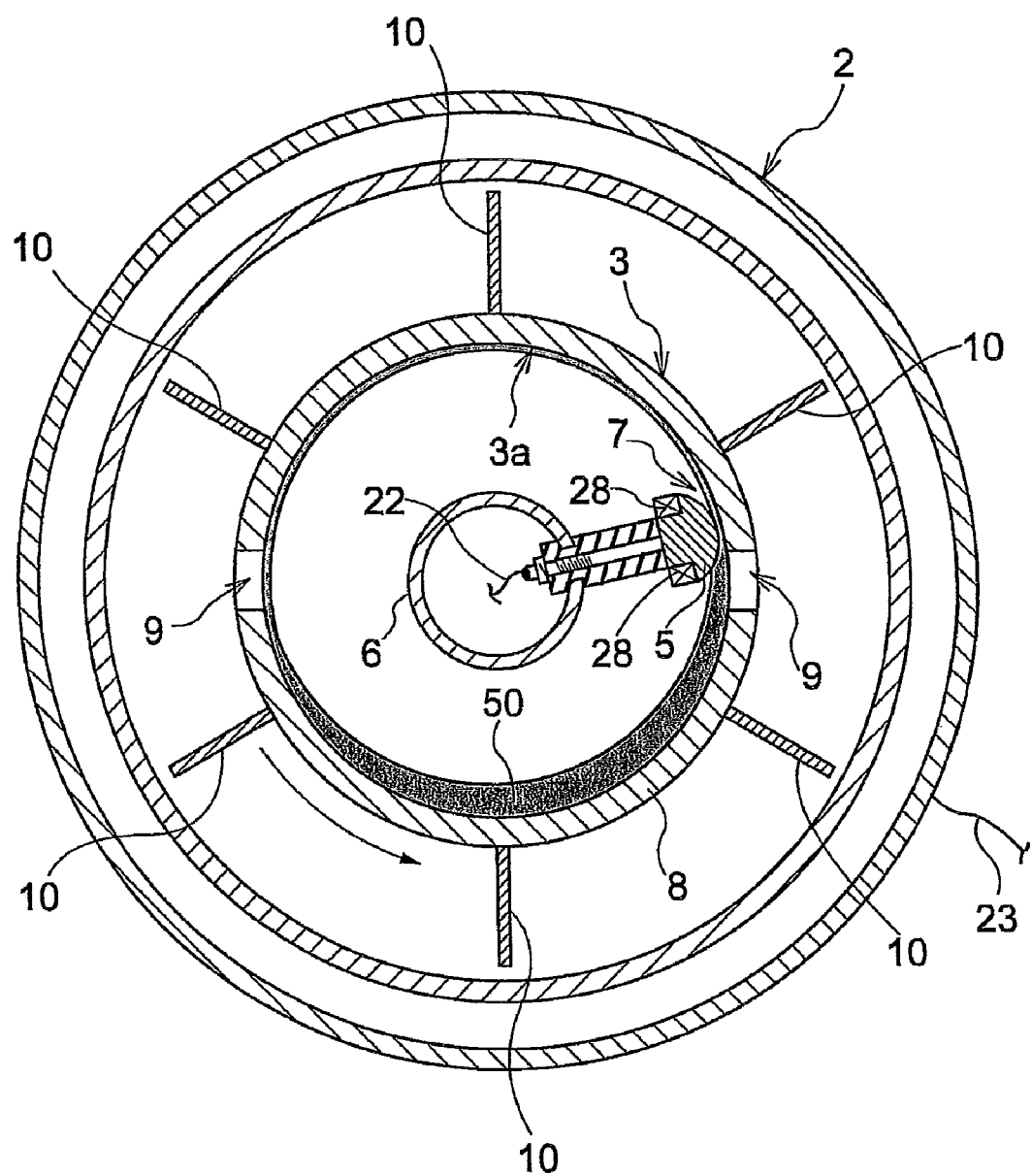
FIG. 2 is a schematic plan view of the powder processing apparatus shown in FIG. 1.

A powder processing apparatus shown in FIG. 1 and FIG. 2 includes a substantially cylindrical casing 2 mounted on a base mount 1, a bottomed cylindrical container member 3 disposed inside this casing 2 and rotatable about a cylinder axis, and a press head 5 (an example of a processing member) disposed inside the container member 3 and fixed to the casing 2. The press head 5 projects from the side of the cylinder axis of the container member 3 toward an accumulating face 3a which is the inner face of the container member 3. And, at the leading end of the press head 5, there is formed a processing face 5a formed in opposition to the accumulating face 3a and convexly curved.

The container member 3 is fixed to a shaft 15 supported to the casing 2 so that the container member 3 is rotatable about the shaft 15. Further, there is provided a rotational driving means 16 comprised of a motor, a pulley, and a belt and so on for rotatably driving the shaft 15.

The rotational drive means 16 rotatably drives the shaft 15 so as to rotate the container member 3 relative to the press head 5 fixed to the casing 2, so that this driving means 16 acts as a moving means for moving the accumulating face 3a as the inner face of the container member 3 and the processing face 5a of the press head 5 relative to each other along the accumulating face 3a.

As the rotational driving means 16 acting as the moving means moves the accumulating face 3a and the processing face 5a relative to each other along the accumulating face 3a, a compressive force and a shearing force are applied to the processing target powder 50 located at a gap 7 between the accumulating face 3a and the processing face 5a. In other words, there can be effected a milling treatment for pressing and rubbing the processing target powder 50 against the accumulating face 3a by the processing face 5a, thereby to generate a strain or to form a newborn face in the surface or its vicinity of the processing target powder 50. With this milling treatment, the surface of the processing target powder 50 can be activated. Incidentally, as the processing target powder 50, powder material is generally employed. Instead, a slurry material or an emulsion material can be employed also.

Incidentally, the width of the gap 7 between the accumulating face 3a and the processing face 5a can be adjusted within a range from e.g. about 0.5 mm to about 10 mm by moving the press head 5 in a direction intersecting the accumulating face 3a. With such adjustment, the milling treatment can be effectively provided to the processing target powder 50.

Further, the speed of the relative movement between the processing face 5a and the accumulating face 3a can be adjusted by adjusting the rotational speed of the rotational driving means 16. Further, if it is desired to increase this rotational speed above the rotational capacity of the rotational driving means 16, it is possible to increase the speed of the relative movement by increasing the inner diameter of the container member 3.

Further, the powder processing apparatus includes also an excitation treatment means 20 capable of applying discharge plasma as excitation energy to the processing target powder 50 accumulated on the accumulating face 3a of the container member 3 from the processing face 5a of the press head 5 as an excitation energy supplying portion.

More particularly, the excitation treatment means 20 is constructed such that a power unit 21 effects alternating current impression of voltage between a lead 22 connected to the press head 5 electrically insulated from the casing 2 and a lead 23 connected to the casing 2. In operation, as the excitation treatment means 20 is activated to impinge the voltage between the lead 22 and the lead 23, there can be generated discharge plasma by glow discharge or arc discharge at the gap 7 between the processing face 5a electrically conducting with the lead 22 and the accumulating face 3a electrically conducting with the lead 23 via the casing 2. Hence, with the activation of this excitation treatment means 20, the discharge plasma generated by the excitation treatment means 20 is irradiated to the processing target powder 50 which is being milled at the gap 7 between the accumulating face 3a and the processing face 5a.

Accordingly, with this powder processing apparatus, the processing target powder 50 can be subjected to the milling treatment and the excitation treatment simultaneously. Further, as these treatments are effected while predetermined another substance is placed in contact with the processing target powder 50, this another substance can be very effectively compounded with the processing target powder 50 which has been milled and excited, so that a compound powder can be manufactured in an efficient manner.

Further, if said another substance is a solid compound such as urea, as this compound powder is mixed with the processing target powder 50 and then changed together into the container member 3 to be treated, this another substance can be compounded with the processing target powder 50 so as to obtain the compound powder.

Further, as shown in FIG. 2, the press head 5 can include a magnet 28 as a magnetic field forming means for forming a magnetic field for delimiting locally an irradiation area of the discharge plasma generated at the gap 7 by the excitation treatment means 20 onto the processing target powder 50, for example.

In order to generate the discharge plasma efficiently, the powder processing apparatus further includes a decompressing pump 27 as a decompressing means capable of decompressing the inside of the casing 2 sealingly housing the container member 3 and the press head 5 below the atmospheric pressure. For example, as the acceleration distance of electrons in the discharge plasma depends on the pressure, then, by rending the pressure inside the casing 2 below 50 Pa, the acceleration distance of electrons exceeds the size of the container member 3, so that the entire inside of the container member 3 can be rendered into discharge plasma field, whereby the treatment efficiency of the processing target powder 50 can be enhanced.

Further, the powder processing apparatus includes a gas supplying means 24 consisting of a gas bottle 25 reserving predetermined processing gas under compression and a supplying pipe 26 for supplying the gas reserved in the gas bottle 25 to the inside of the casing 3.

Also, in case another substance is compounded with the processing target powder 50 with the irradiation of the discharge plasma as the excitation energy from the excitation treatment means 20 to the processing target powder 50, the gas supplying means 24 can supply into the casing 3 various processing gas containing another substance such as argon gas or helium gas as high energy ion source, so that this processing gas can be effectively contacted with the processing target powder 50 to be compounded therewith.

The processing target powder 50 provided with the compressive force and the shearing force by the press head 5 will be discharged to the outside through a hole 9 defined mainly in a peripheral wall 8 of the container member 3 and then circulated back into the container member 3 by means of a blade member 10 formed in an outer periphery of the peripheral wall 8. With this construction, the processing target powder 50 bound at the gap 7 between the processing face 5a and the accumulating face 3a can be caused to flow and circulate positively, whereby the amount of adhesion of the processing target powder 50 to the accumulating face 3a can be reduced advantageously.

If such apparatus as this powder processing apparatus adapted for circulating the compound powder 4 via the hole 9, e.g. the compressive force to be applied to the processing target powder 50 can be adjusted appropriately.

For instance, if the aperture area of the hole 9 is set large, then, the processing target powder 50 will be easily discharged to the outside of the container member 3, so that the time of the processing face 5a acting on the processing target powder 50 will be shorter. As a result, the compressive force applied to the processing target powder 50 will be weaker. Conversely, if the aperture area of the hole 9 is set small, the time of the processing face 5a acting on the processing target powder 50 will be longer and the compressive force applied to the processing target powder 50 will be stronger.

As described above, when the powder processing apparatus according to this embodiment is employed, while effecting the milling treatment and the excitation treatment to the processing target powder 50 simultaneously, e.g. the compressive force can be varied as desired, so that the optimum powder processing conditions can be realized, hence compound powder of superior quality can be manufactured.

Next, there will be described examples using the powder processing apparatus wherein while nitrogen element as another substance is placed in contact with titanium oxide powder as the processing target powder 50, the milling treatment and the excitation treatment are effected simultaneously, thereby to compound nitrogen with the titanium oxide powder, thus manufacturing nitrogen-containing titanium oxide powder.

EXAMPLE 1

In this Example 1, nitrogen gas was supplied by the gas supplying means 24 into the casing 2 so as to fill the inside of the casing 2 with the nitrogen gas. Under this condition and for about 30 minutes, while milling treatment of the titanium oxide powder was effected at the gap 7 between the processing face 5a and the accumulating face 3a, glow discharge plasma was irradiated thereto, so as to compound nitrogen element in the nitrogen gas with the titanium oxide powder. By this method, yellow-colored nitrogen-containing titanium oxide powder can be manufactured.

EXAMPLE 2

In this Example 2, mixture powder containing titanium oxide powder and urea powder mixed together was discharged into the container member 3. Then, the gas supplying means 24 supplied argon gas and helium gas as high energy ion sources into the casing 2, thereby to fill the inside of the casing 2 with argon gas, helium gas or the like. Under this condition and for about 5 to 30 minutes, while this mixture powder was being milled at the gap 7 between the processing face 5a and the accumulating face 3a, the discharge plasma was irradiated thereto, whereby nitrogen contained in the urea was compounded with the titanium oxide powder. By this method, yellow-colored nitrogen-containing titanium oxide powder can be manufactured.

In Examples 1 and 2 described above, when the width of the gap 7 was set to 1, 3, 5 mm, and the pressure inside the casing 2 decompressed by the decompressing means was set to the range from 10 Pa tot kPa., and the voltage impinged by the power unit 21 was set to the range from 500 V to 5000 V, and the rotational speed of the container, i.e. the speed of relative movement of the processing face 5a relative to the accumulating face 3a was set to the range from 1 m/s to 30 m/s, the nitrogen-containing titanium oxide power could be manufactured effectively.

Further, the nitrogen-containing titanium oxide powder manufactured respectively by the method of Example 1, 2 described above showed the characteristics of breaking up methylene blue under fluorescent lamp illumination, hence its photocatalyst function could be confirmed qualitatively.

In Example 1 and Example 2 described above, the kind of discharge plasma generated at the gap 7 was glow discharge. With further increase of the voltage, this will be rendered into arc discharge employed in welding. And, it is believed that with such arc discharge too, another substance such as nitrogen element can be compounded with the processing target powder such as titanium oxide powder.

EXAMPLE 3

In this Example 3, the nitrogen-containing titanium oxide powder manufactured by the method of the above-described Example 2 was subjected to a heat treatment in which the powder was heated to 500° C. and maintained under this condition for 30 minutes and then was allowed to be cooled to the room temperature. The nitrogen-containing titanium oxide powder after the heat treatment manufactured by the method of this Example 3 showed stronger yellow color when compared with the nitrogen-containing titanium oxide powder before the heat treatment manufactured by the method of Example 2. Hence, it is believed that this powder has a more stable compounded condition of the nitrogen relative to the titanium oxide powder.

Further, for the un-processed raw titanium oxide powder, the nitrogen-containing titanium oxide powder before the heat treatment manufactured by the method of Example 2, and the nitrogen-containing titanium oxide powder after the heat treatment manufactured by the method of this Example 3, the time periods required thereby for the breaking up of methylene blue under the fluorescent lamp illumination were determined.

The results were that the breaking-up time period by the titanium oxide powder was 48 hours, the breaking-up time period by the nitrogen-containing titanium oxide powder before the heat treatment manufactured by the method of Example 2 was 24 hours, and the breaking-up time period by the nitrogen-containing titanium oxide powder after the heat treatment manufactured by the method of this Example 3 was 12 hours.

From the above, it could be confirmed that nitrogen-containing titanium oxide powder after the heat treatment manufactured by the method of this Example 3 achieves very high photocatalyst function, as compared with the titanium oxide powder and also the nitrogen-containing titanium oxide powder before the heat treatment manufactured by the method of Example 2.

The above embodiment of the powder processing method and the first embodiment of the powder processing apparatus have been described mainly for the construction in which nitrogen element was compounded with the surface of titanium oxide powder, thereby to manufacture nitrogen-containing titanium oxide. Instead, the powder processing method and the powder processing apparatus relating to the present invention can manufacture any kind of compound such as employing one of metal powder and ceramics powder as the processing target powder and the other thereof as another substance and compounding metal with ceramics, or compounding carbon nano tube as the processing target powder with another element than carbon, and so on.

Further, processing target powder comprised of carbon, aluminum, silicon, etc. can be compounded with nitrogen, thereby to manufacture nitrogen-containing powder containing phases of carbon nitride, aluminum nitride, silicon nitride, etc. Further, as such nitrogen-containing powder has high hardness, it is possible to employ it as polishing agent for industrial use for example. Also, as phases of aluminum nitride and silicon nitride are formed on the surface of the compound powder, heat conductivity and corrosion resistance are improved.

In the above-described first embodiment of the powder processing apparatus, the apparatus can include oscillating means for oscillating the accumulating face 3a or the processing face 5a along the direction intersecting the accumulating face 3a. Also, in the milling treatment for milling the processing target powder 4 by applying a compressive force and a shearing force thereto, by activating the above-described oscillating means, it is possible to effectively coagulate the processing target powder 4 comprised of e.g. compound powder, so that porous granulated substance can be manufactured in an efficient manner. That is, the excitation treatment means 20 will provide the excitation energy to the processing target powder 50, thereby to excite the surface of the processing target powder 50 to an activatable condition where the particles of the powder can easily coagulate with little adhesion of e.g. organic substance thereto. And, as this activated processing target powder 50 is caused to pass the gap between the accumulating face 3a oscillated by the oscillating means and the processing face 5a, whereby coagulation of particles of the processing target powder 50 is promoted and the porous granulated substance can be manufactured in an efficient manner. Incidentally, the detailed construction of this oscillating means will be described in the following second embodiment of the powder processing apparatus.

Second Embodiment of the Powder Processing Apparatus

Next, the second embodiment of the powder processing apparatus relating to the present invention will be described with reference to FIGS. 3 and 4.

Incidentally, description of the same construction as the above-described first embodiment of the powder processing apparatus will be omitted.

Figure 3:
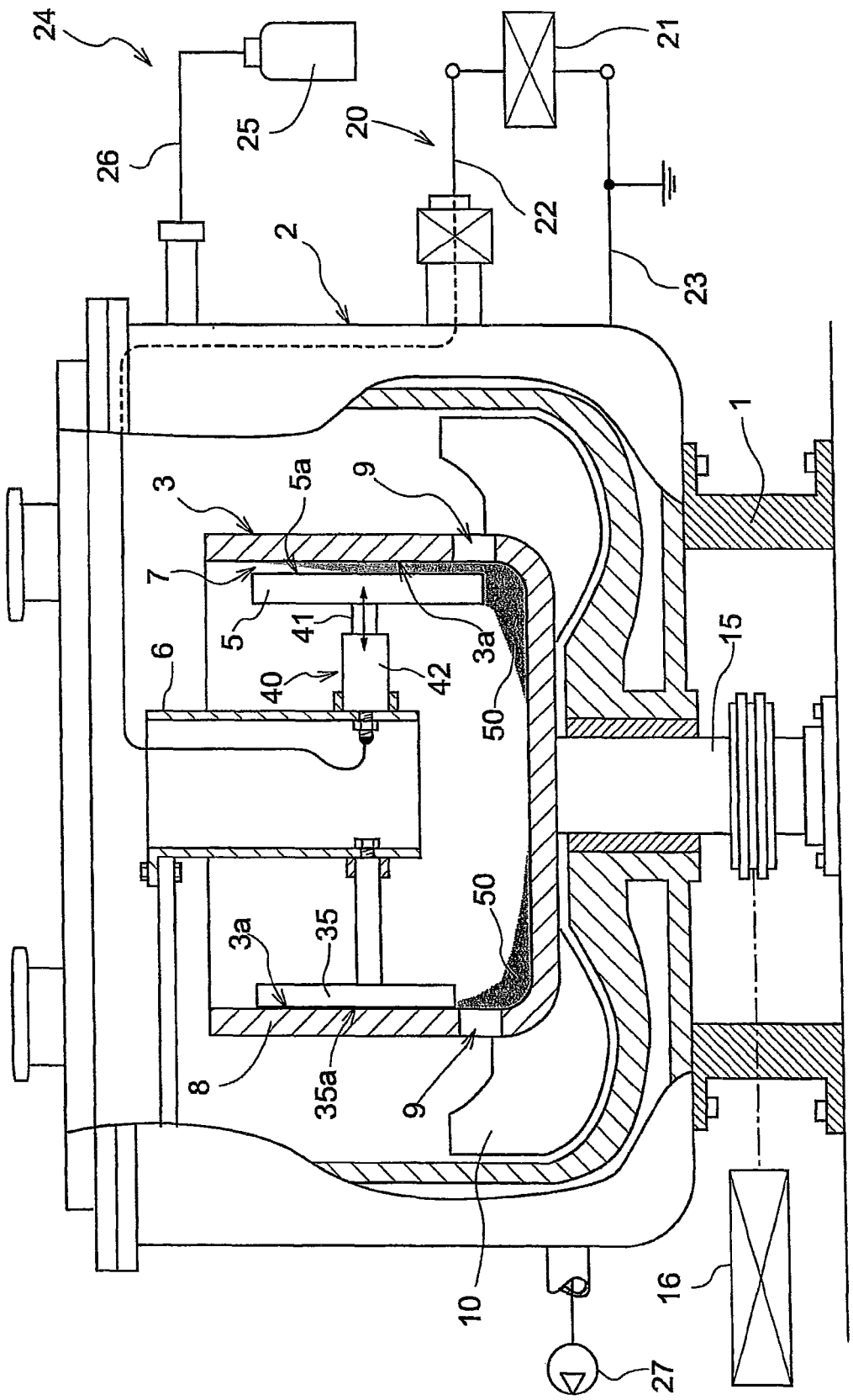
FIG. 3 is a schematic elevation showing a second embodiment of the powder processing apparatus.
Figure 4:
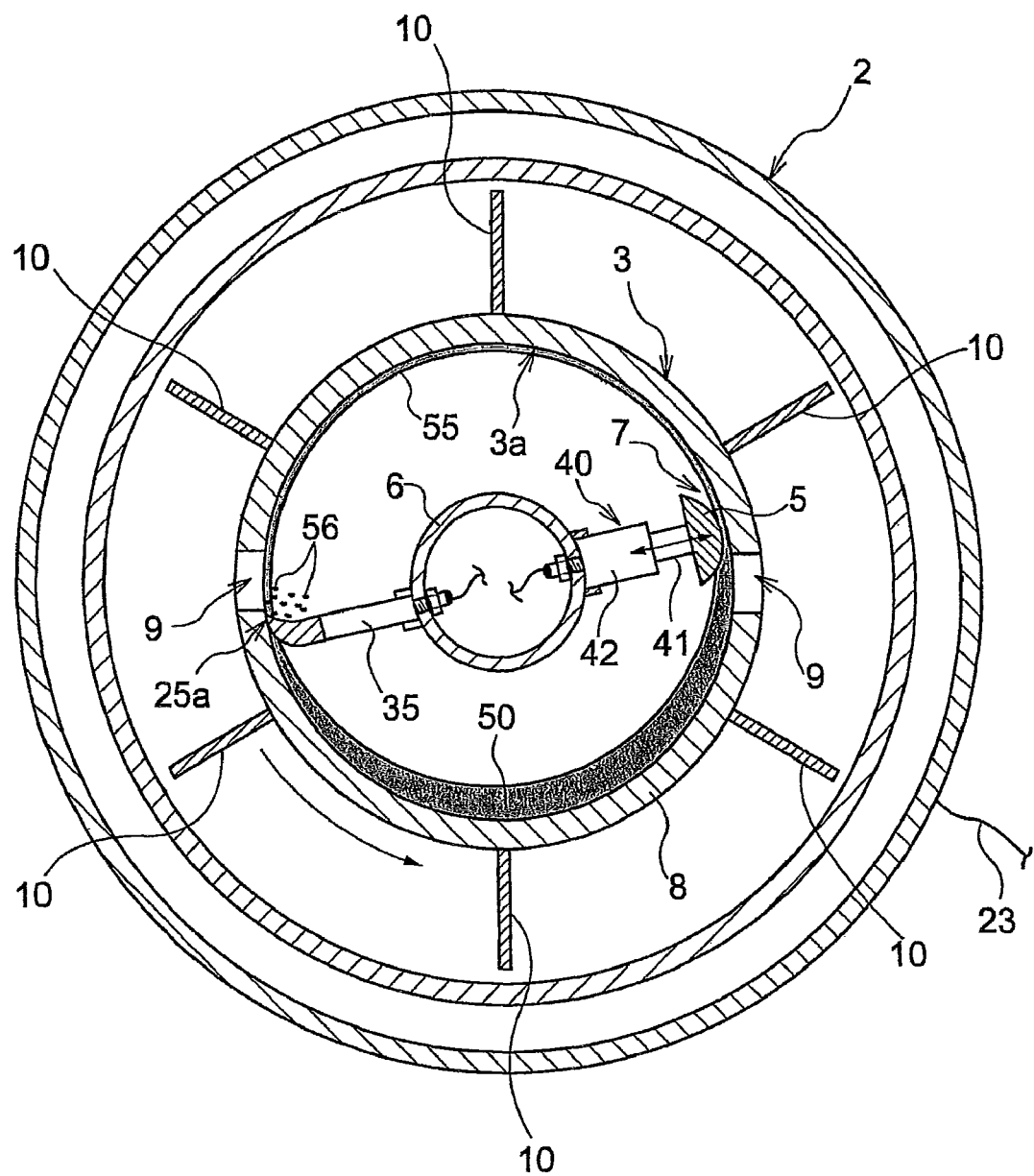
FIG. 4 is a schematic plan view of the powder processing apparatus shown in FIG. 3, and FIG. 5 (a) is a view showing a condition of processing target powder, FIG. 5 (b) is a view showing a condition of porous granulated substance, and FIG. 5 (c) is a view showing a condition of porous granulated substance powder.

In the powder processing apparatus shown in FIG. 3 and FIG. 4, the press head 5 having the processing face 5a at the leading end thereof is fixed to an oscillator 41 of an electromagnetic oscillation actuator 40. Further, a stator 42 of this electromagnetic oscillation actuator 40 is fixed to a support portion 6 disposed adjacent the axis of the container member 3. Also, this electromagnetic oscillation actuator 40 is constructed and arranged such that the oscillator 41 is oscillated relative to the stator 42 in the direction intersecting the accumulating face 5a, preferably, in the direction normal to the accumulating face 5a (i.e. the cylinder diameter direction of the container member 3).

That is, the electromagnetic oscillation actuator 40 acts as an oscillating means for oscillating the press head 5 in the direction intersecting the accumulating face 5a, thereby to oscillate the processing face 5a relative to the accumulating face 3a along the direction intersecting the accumulating face 3a.

As the electromagnetic oscillation actuator 40 acting as the above-described oscillating means oscillates the processing face 5a along the direction intersecting the accumulating face 3a, the frictional force generated between the processing target powder 50 accumulated on the accumulating face 3a and the processing face 5a is reduced, so that the shearing force applied to the processing target powder 50 can be reduced.

Further, as electromagnetic oscillation actuator 40 oscillates the processing face 5a along the direction intersecting the accumulating face 3a, an impact force is applied to the processing target powder 50, so that the compressive force to the applied to the processing target powder 50 can be increased.

The electromagnetic oscillation actuator 40 is adapted to allow adjustment of the oscillation frequency of the oscillator 41, i.e. of the processing face 5a. Then, with such adjustment of the oscillation frequency of the processing face 5a, the frictional force generated between the processing target powder 50 and the processing face 5a can be varied so as to appropriately adjust the ratio of the shearing force to be applied to the processing target powder 50 relative to the compressive force.

As described above, as the processing target powder 50 is processed with the activations of both the rotational driving means 16 and the electromagnetic oscillation actuator 40, a relative small shearing force can be applied to the processing target powder 50 present at the gap 7 between the accumulating face 3a and the processing face 5a to render the surface of this processing target powder 50 into an appropriately activated face and at the same time a very strong compressive force can be applied thereto to strongly press the particles of the processing target powder 50 against each other thereby to coagulate the processing target powder 50, so that the porous granulated substance 55 having a number of pores 51 can be manufactured as shown in FIGS. 5 (a) and (b).

Further, at the support portion 6, on the side opposite to the side where the electromagnetic oscillation actuator 40 connected to the press head 5 is fixed, there is provided a scraper 35 having a crushing portion 35a projecting beyond the processing face 5a toward the accumulating face 3a.

That is, by the rotational driving means 16, the crushing portion 35a of the scraper 35 is moved relative to the accumulating face 3a, like the processing face 5a of the press head 5, and as this portion is located rearwardly of the processing face 5a in the direction of this relative movement, the crushing portion crushes or strips the porous granulated substance 55 adhering the accumulating face 3a as being pressed thereto by the processing face 5a, off the accumulating face 3a. So that, as shown in FIG. 5 (c), there can be obtained porous granulated substance 56 having good feeding and having an appropriate particle size to be molded into any desired shape.

Further, as the processing face 5a provides a strong compressive force to the processing target powder 50 thereby to form the porous granulated substance 55, this porous granulated substance 55 will be affixed to and accumulated on the accumulating face 3a. And, the operation by the crushing portion 35a for crushing the porous granulated substance 55 accumulated on the accumulating face 3a into porous granulated powder 56 is repeatedly carried out by rotating the container member 3 by the rotational driving means 16, the mutual bonding and separation of the respective particles of the porous granulated substance 56 are effected in repetition, so that the arrangement of the processing target powder 50 in the porous granulated powder 56 can be relatively stable, hence, a number of extremely small pores 51 can be formed in the porous granulated substance 55 and its powder 56.

The crushing portion 35a is shaped like a blade disposed adjacent the accumulating face 3a and has its blade edge bitten into a position of the porous granulated substance 55 adhered to the accumulating face 3a.

Incidentally, the shape of the crushing portion 35a is not particularly limited as long as it can crush the porous granulated substance 55 adhering to the accumulating face 3a. For instance, its leading end can be formed like a comb which slidably contacts or which is disposed adjacent the accumulating face 3a.

In the powder processing apparatus, with appropriate setting of the various kinds of condition such as the width of the gap 7 between the accumulating face 3a and the processing face 5a, the relative movement speed of the rotational driving means 16 between the accumulating face 3a and the processing face 5a, the oscillation frequency of the electromagnetic oscillation actuator 40, the kind of the processing target powder 50, the average particle diameter of the processing target powder 50 constituting the porous granulated substance 55 can be 1 μm or less, the average diameter of the pores 51 constituting the porous granulated substance 55 can be 100 nm or less and the movement of air molecules can be effectively restricted by the pores 51 and entrance of the air molecules into the pores 51 can be restricted, so that the porous granulated substance 55 and its powder 56 capable of achieving super low heat conductivity and super sound absorbency can be manufactured.

The porous granulated powder 56 or the processing target powder 50 will be discharged to the outside through the hole 9 defined mainly in the peripheral wall 8 of the container member 3 and then circulated back into the container member 3 by means of the blade member 10 formed in an outer periphery of the peripheral wall 8.

As the processing target powder 50, particles of any kind of material can be employed, depending on the intended use of the porous granulated substance. For instance, as the processing target substance 50, inorganic particles of titanium oxide, aluminum oxide, silicon carbide, silicon nitride, silica, etc. can be used.

Further, if material having low heat conductivity such as silica is employed as the processing target powder 50, it is possible to reduce solid heat transfer in the porous granules 55 and its porous granulated powder 56, whereby even further reduction in the heat conduction can be achieved.

Moreover, if material having low infrared transmissivity, such as titania, silicon carbide, etc. is selected as the processing target powder 50, it is possible to reduce the radiant heat transmission in the porous granules 55 and the porous granulated powder 56, whereby even further reduction in the heat conduction can be achieved. Further, by using titania together with the processing target powder 50, it is possible to manufacture porous granules having photocatalyst function.

Also, the powder processing apparatus, like the first embodiment described above, can further include the excitation treatment means 20 capable of applying discharge plasma as excitation energy to the processing target powder 50 accumulated on the accumulating face 3a of the container member 3 from the processing face 5a of the press head 5 as an excitation energy supplying portion disposed in opposition to the accumulating face 3a of the container member 3. Incidentally, the description of the detailed construction of the excitation treatment means 20 will be omitted as it is same as the first embodiment described above.

And, with the activation of this excitation treatment means 20, the processing target powder 50 being milled at the gap 7 between the accumulating face 3a and the processing face 5a will be subjected to irradiation of discharge plasma generated by the excitation treatment means 20. So that, the processing target powder 50 can be excited to an active state, whereby the coagulation of the processing target power 50 can be even further promoted.

Other Embodiments

In the first and second embodiments of the powder processing apparatus described above, when the excitation treatment means 20 is used for generating the discharge plasma, especially, discharge plasma by arc discharge, it is conceivable that etching of the accumulating face 3a and the processing face 5a can be a source of pollution. Hence, it is preferred that the accumulating face 3a and the processing face 5a be coated with the same material as the processing target powder.

In the first and second embodiment of the powder processing apparatus, the decompressing pump 27 for decompressing the inside of the casing 2 was provided as the decompressing means. However, as glow discharge plasma by the excitation treatment means 20 is still possible even when the pressure inside the casing 2 is the atmospheric pressure, it is believed to be possible to compound another substance such as nitrogen element with the processing target powder such as titanium oxide powder for instance or to excite the processing target powder 50 to the active state for promoting coagulation of the processing target powder 50. Therefore, the decompressing means can be omitted.

In the first and second embodiments of the powder processing apparatus, the excitation treatment means 20 was constructed so as to generate discharge plasma by glow discharge or arc discharge at the gap 7 between the processing face 5a and the accumulating face 3a, thereby to activate the processing target powder 50. However, in case the pressure inside the casing 2 is the atmospheric pressure, it is also possible for the excitation treatment means 20 to effect spark discharge at the gap 7. And, as this spark flows into the processing target powder 50 present at the gap 7, Joule heat will be generated to activate and refine the powder, so that compounding of another substance with the processing target powder becomes possible.

In the first and second embodiments of the powder processing apparatus, the gas supplying means 24 was provided for supplying the processing gas into the casing 2. However, in case the milling treatment and the excitation treatment are effected in the air atmosphere, this gas supplying means 24 can be omitted.

In the first and second embodiments of the powder processing apparatus, as the excitation treatment, the discharge plasma as the excitation energy was applied to the processing target powder undergoing the mechanical treatment such as the milling treatment, whereby the processing target powder was activated. Alternatively, as the excitation energy, UV beam or electromagnetic wave such as microwave can be irradiated for the activation of the processing target powder. For instance, in the excitation treatment, if UV beam is irradiated by using also a discharge plasma such as argon, organic substance adsorbed to the surface of the processing target powder can be removed efficiently. Further, if the irradiation of UV beam is effected in an oxygen-containing atmosphere, ozone will be generated, so that the organic substance adsorbed to the surface of the processing target powder can be removed by decomposition and oxidation.

Further, in case electromagnetic wave is irradiated, the wavelength of this electromagnetic wave will be selected, depending on the absorbing wavelength of the processing target powder. Also, in case electromagnetic wave is irradiated as the excitation energy, a surface of such material as quartz, glass or alumina can be formed on the surface of the excitation energy supplying portion (e.g. the processing face 5*a*), so that the excitation energy can be irradiated from inside the excitation energy supplying portion through its surface.

In the first and second embodiments of the powder processing apparatus described above, only one press head 5 was provided. Instead, a plurality of press heads 5 can be provided in tandem so as to reduce the processing time.

Further, in case a plurality of press heads 5 are provided in tandem, the compressive forces and the shearing forces applied to the processing target powder 50 can be made different from each other by varying the widths of the gaps 7 of the processing faces 5*a* of the respective press heads 5 and the accumulating face 3 relative to each other. And, of these plural press heads 5, the excitation treatment means 20 shown in FIGS. 1 and 2 and the electromagnetic oscillation actuator 40 acting as the oscillating means shown in FIG. 3 and FIG. 4 can be provided only to the press head 5 having the narrowest width 7 of them all.

Further, in the above, the processing face 5*a* of the press head 5 acted as the excitation energy supplying portion for applying the excitation energy to the processing target powder 50. Instead, the excitation energy supplying portion can be provided at e.g. the crushing portion 35*a* of the scraper 35 shown in FIG. 3 and FIG. 3, separately from the press head 5. With such construction, it can be expected to obtain further promotion of refining and improve the uniformity of the processing target powder.

Further, in case there exists a gap allowing passage of the processing target powder 50 aside from the gap 7 between the press head 5*a* and the processing face 5*a*, walls forming such gap therebetween can be utilized the excitation energy supplying portion.

Further, for stability and accurate positioning of the irradiation of the excitation energy such as the discharge plasma, the excitation energy supplying portion such as the processing face can be formed like the so-called "frog" having projections projecting toward the processing target powder.

In the embodiments described above, a portion of the drive force of the shaft member 15 rotated by the rotational driving means 16 can be utilized for electric power generation to be used as the power source of the excitation treatment means 20.

In the embodiments described above, the rotational driving means 16 rotatably drove only the container member 3 via the shaft member 15, thereby to move the processing face 5*a* relative to the accumulating face 3*a* along this accumulating face 3*a*. Instead, the rotational driving means 16 can rotatably drive only the press head 5 or the container member 3 and the press head 5 so as to move the processing face 5*a* relative to the accumulating face 3*a* along this accumulating face 3*a*.

The present invention can be widely used in the techniques relating to the powder processing method and the powder processing apparatus for processing a processing target powder by subjecting the powder to a mechanical treatment such as a milling treatment for milling the powder by applying a compressive force and a shearing force thereto, thereby to sufficiently activate the processing target powder to be compounded with another substance, thus obtaining a compound powder or to such technique for manufacturing porous granulated substance or the like having a number of pores by coagulating said processing target powder.

The invention claimed is:

1. A powder processing apparatus comprising:
   an accumulating face on which the processing target powder is to be accumulated;
   a processing face disposed in opposition to the accumulating face and convexly curved;
   moving means for moving the accumulating face and the processing face along the accumulating face relative to each other, wherein as the processing face is moved along and relative to the accumulating face by the moving means, a compressive force and a shearing force are applied to the processing target powder at a gap between the accumulating face and the processing face, whereby the processing target powder is milled; and
   the apparatus further comprises an excitement treatment means for irradiating discharge plasma as an excitation energy to the processing target powder accumulated on the accumulating face from an excitation energy supplying portion disposed in opposition to the accumulating face.

2. The powder processing apparatus according to claim 1, further comprising magnetic field forming means for forming a magnetic field for delimiting an irradiation area of the discharge plasma onto the processing target powder.

3. The powder processing apparatus according to claim 1, wherein said excitation treatment means is configured to act as said excitation energy supplying portion for irradiating the excitation energy from said processing face onto the processing target powder.

4. The powder processing apparatus according to claim 1, wherein:
   said accumulating face is formed in an inner face of a bottomed cylindrical container member;
   said processing face is formed at a leading end of the processing member which projects from a side of a cylinder axis of the container member toward a side of the accumulating face; and
   said moving means is configured to rotatably drive the container member about the cylinder axis thereof.

5. The powder processing apparatus according to claim 4, further comprising decompressing means capable of decompressing the inside of a casing sealingly housing said container member and said processing member to a pressure below the atmospheric pressure.

6. The powder processing apparatus according to claim 4, further comprising gas supplying means capable of supplying a predetermining processing gas to the inside of the casing sealingly housing the container member and the processing member.

7. The powder processing apparatus according to claim 1, further comprising oscillating means for oscillating said accumulating face and said processing face along a direction intersecting said accumulating face.

\* \* \* \* \*

UNITED STATES PATENT AND TRADEMARK OFFICE
CERTIFICATE OF CORRECTION

PATENT NO. : 7,905,434 B2  
APPLICATION NO. : 12/718614  
DATED : March 15, 2011  
INVENTOR(S) : Naito et al.

Page 1 of 1

It is certified that error appears in the above-identified patent and that said Letters Patent is hereby corrected as shown below:

Title Page, insert the following:

--(56)  References Cited

FOREIGN PATENT DOCUMENTS

| | | |
|---|---|---|
| JP | 2002-154823 A | 5-2002 |
| JP | 8-38917 A | 2-1996 |
| JP | 6-134274 A | 5-1994 |
| JP | 5-317679 A | 12-1993 |
| JP | 2000-140636 A | 5-2000 |
| JP | 3-188935 A | 8-1991 |
| JP | 1-143759 A | 6-1989 |
| JP | 63-283767 A | 11-1988 |
| JP | 63-42728 A | 2-1988 |
| JP | 59-145038 A | 8-1984 |
| JP | 2-57143 U | 4-1990 |
| JP | 2004-261747 A | 9-2004 |
| JP | 57-177342 A | 11-1982 |
| JP | 10-265710 A | 10-1998 |
| JP | 06-000365 A | 1-1994 |
| JP | 11-43759 | 2-1999-- |

Signed and Sealed this  
Sixteenth Day of August, 2011

David J. Kappos  
*Director of the United States Patent and Trademark Office*